May 6, 1930.  H. W. CODDINGTON ET AL  1,757,619
JOURNAL BOX LUBRICATOR
Filed Sept. 15, 1925
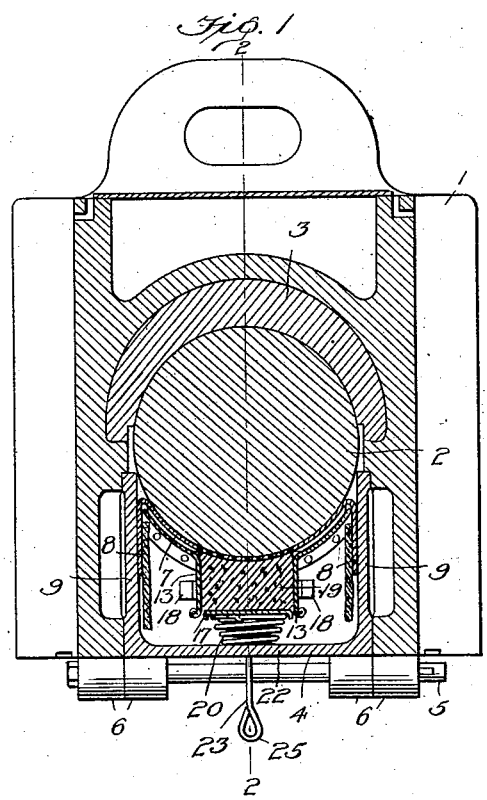
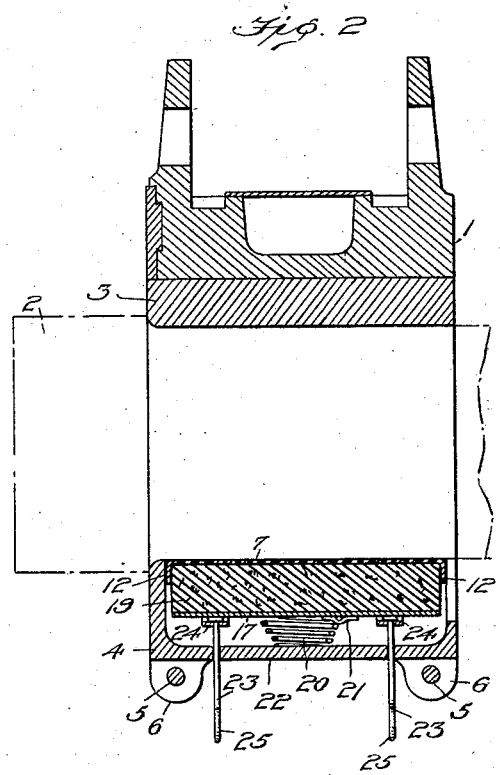
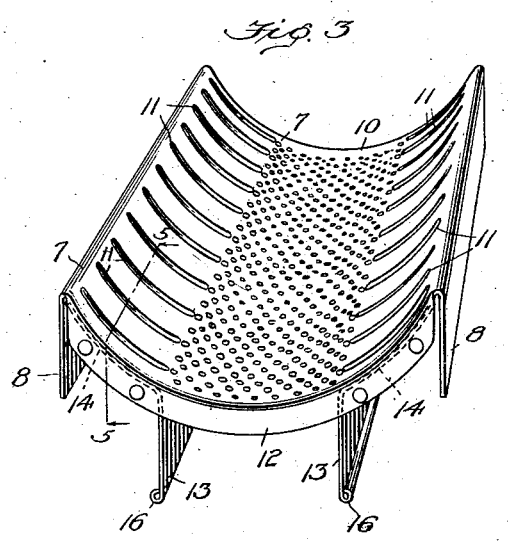
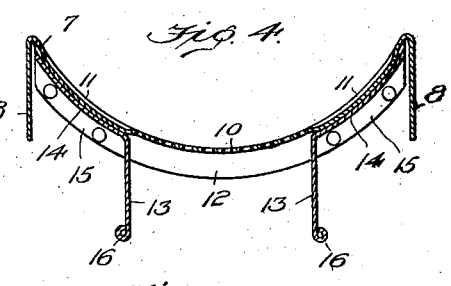
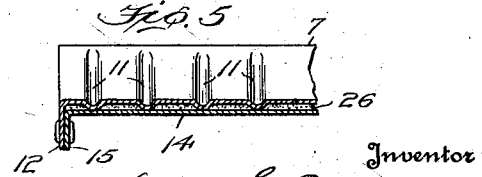
Inventor
Harry F. Cumming
Harley W. Coddington
By
his Attorney Patented May 6, 1930

1,757,619

UNITED STATES PATENT OFFICE

HARRY W. CODDINGTON AND HARRY F. CUNNING, OF ROANOKE, VIRGINIA

JOURNAL-BOX LUBRICATOR

Application filed September 15, 1925. Serial No. 56,441.

Our invention relates to journal box lubricators and more particularly to a type especially designed for conserving lubricating material while at the same time providing for the adequate lubrication of the associated journal.

The principal object of our invention, generally considered, is the provision of a journal box lubricator especially adapted for feeding grease or other suitable lubricant to locomotive driving wheel journals along a reduced or narrower circumferential area than usual and distributing said material from said reduced area whereby a great economy is effected in the use of said lubricating material.

An object of our invention is the production of a journal box lubricator which feeds grease or the like to an associated journal along a relatively small circumferential area thereof instead of along nearly half of the circumferential area whereby a great saving is effected in the consumption of said grease or the like.

Another object of our invention is to provide a journal box lubricator especially adapted to apply hard grease to an associated journal, said grease being applied to the lubricator in the form of a relatively hard unyielding cake, the cake being of materially less width than the diameter of the axle, and being positioned beneath the axle with a rubbing plate interposed between the upper surface of the grease cake and the under peripheral surface of the axle, said rubbing plate being of materially greater width than the width of the grease cake, and being perforated over an area corresponding approximately to the area of the top surface of the grease cake, said rubbing plate carrying wings or extensions arranged along the sides of the perforated area thereof.

Another object of our invention is the provision of wings or shelves on each side of the area through which lubricant is fed to a journal box, said wings being grooved or corrugated preferably circumferentially and curved to fit around portions of the associated journal so as to collect and distribute grease or other lubricant to said journal.

Another object of our invention is the provision of a journal box lubricator which feeds grease or the like to an associated journal along a reduced area and is provided with shelves on either side of said feeding area, which shelves partly surround the adjacent portions of the journal and serve to protect the same from foreign matter, said shelves also being adapted for the application of insulating material thereto for the maintenance of the desired temperature when the journal is in operation for causing the grease or other lubricant utilized to flow to the desired degree and properly lubricate the journal.

A still further object of our invention is the provision of a journal box lubricator which feeds lubricating material to an associated journal along a relatively narrow area and then distributes the grease from said area along grooves or channels in associated shelves, said shelves being provided with depending flanges and a spring pressed follower operating between said flanges to force lubricating material confined between the flanges and follower through the desired feeding area preferably in the form of a perforated section of plate, said depending flanges being preferably provided with lugs for facilitating removal of the lubricating plate. According to the invention the flanges, in effect, form a cellar member supported by and housing the grease cake.

There are other objects and advantages of the invention which will become more apparent as the description proceeds.

Referring to the drawings illustrating our invention, the scope whereof is defined by the claims:

Figure 1 is a transverse vertical sectional view through a journal and associated journal box to which an embodiment of our lubricator has been applied.

Figure 2 is a sectional view at right angles to that shown in Figure 1 on the line 2—2 thereof.

Figure 3 is a perspective view of the lubricating plate of our invention.

Figure 4 is a transverse section of said lubricating plate as shown in Figure 1 but enlarged and removed from the journal box.

Figure 5 is a partial sectional view on the line 5—5 of Figure 3 looking in the direction of the arrows.

Considering the drawings in detail, like parts being designated by like reference characters, one embodiment of our invention is illustrated applied to a locomotive driving wheel journal box 1 which is supported on one of the journals 2 of a locomotive axle and guided between frame pedestals, not shown, in accordance with the usual practice. It is obvious, however, that our lubricator is adapted for application to other forms of journal boxes and especially those utilizing a solid or semi-solid form of lubricant such as grease, greasy compounds or mixtures.

The journal box 1 is provided with a brass 3 applied between the same and the journal 2 in accordance with the usual practice. A usual form of oil cellar 4 is shown supported between the lower portions of the journal box 1 by means of bolts 5 extending through cooperating apertured lugs 6 on the journal box and cellar.

The lubricating plate 7 of our improved lubricator, shown in detail in Figures 3, 4 and 5, is preferably formed with an intermediate curved portion adapted to fit around the lower portion of the journal 2 and of a curvature corresponding to said journal and provided with depending side edge or flange portions 8 guided between and held in place by the side walls 9 of the cellar 4. It will be apparent from considering Figure 3 particularly that the intermediate or curved portion 10 of our lubricating plate 7 is foraminous or perforated along the central portion thereof preferably axial with respect to the associated journal. That is, the width of said perforated portion is considerably less than the diameter of the journal or the width of the lubricating plate. On either side of said foraminous portion the lubricating plate is preferably corrugated or formed with grooves 11 in the upper surface thereof, said grooves preferably extending circumferentially as indicated particularly in Figure 3. The outer and inner edges of the curved portion of the lubricating plate 7 are preferably formed with depending flanges 12 and secured to said flanges are lubricant enclosing and follower guiding members 13, said guiding members preferably comprising depending flange portions extending downwardly to either side of the foraminous portion 10 of the lubricating plate and curved wing or side portions 14 extending below the corrugations or grooves 11 and the corresponding portion of the lubricating plate 7.

The members 13 and the lubricating plate 7 are preferably connected together by rivets or the like extending through flanges 12 of the lubricating plate and cooperating flanges 15 from the wing portions 14 of said guiding members 13. The lower edges of said guiding members 13 are preferably flared outwardly or beaded as indicated at 16 to facilitate insertion of the follower member 17 between said guiding portions. The follower 17 is preferably flanged downwardly at its sides, as indicated particularly in Figure 1, for example, so that it is properly guided between the walls of the grease compartment without undesired tilting. The depending flanges of the guiding members 13 may be provided with lugs 18 to facilitate removal of said lubricating plate 7. The follower 17 is preferably pressed upwardly against a mass of grease 19 or other suitable lubricating material confined between the guiding portions 13 of the lubricating plate 7 by resilient means, such as a coil spring 20, preferably attached to the bottom of said follower 17 by means of clamping members 21. The lower portion of said spring 20 preferably rests upon the floor or bottom wall 22 of the oil cellar 4.

To facilitate the insertion of grease between the follower 17 and the foraminous portion of the lubricating plate 7, a plurality of controlling wires or rods 23 are preferably provided connected to the lower surface of the follower 17 in any desired manner as by means of apertured plates or cleats 24 embracing the headed upper ends of said rods 23 and riveted or otherwise suitably connected to said follower 17. The lower ends of said wires or rods 23 preferably extend through the floor or lower wall 22 of the cellar 4 and are bent or formed into eyes 25 for the more convenient manipulation of said members 23.

After the lubricating plate 7 has been positioned as indicated in Figure 1 with the follower held down by means of the rods 23 extending therefrom, the desired amount of lubricating material 19 may be applied between the members 13 beneath the foraminous portion of the lubricating plate 7 and above the follower 17. When said follower 17 is released it presses the lubricant or grease 19 against the perforated portion of the lubricating plate thereof, efficiently feeding said lubricating material to the journal 2 and at the same time pressing the lubricating plate 7 against said journal. On account of said perforated portion being relatively narrow a much lower rate of grease consumption will be effected by utilizing a device constructed according to our invention. The wings or shelves on either side of the perforated portion of the lubricating plate serve to wipe the journal and collect and distribute the grease thereto, carrying on the surface thereof a supply of said grease that is available immediately upon an increase in temperature of the journal that would tend to melt the grease or produce a hot bearing. Although said wings are preferably grooved as illustrated, they may, if desired, be formed plain or grooved in other ways within the spirit and scope of our invention. These unperforated surfaces or wings serve to protect the associated surface of the journal from foreign material that might deleteriously effect the condition of the bearing. Said wings or shelves if desired may carry insulating material on the underside thereof either outside of the portions 14 of the guiding members 13 or between said portions and said wings, as indicated at 26, to maintain the desired temperature when the journal is in operation for causing the grease to flow and lubricate properly.

A usual form of lubricating material for journals of this character is a mechanical mixture consisting of a soapy material which acts as a sponge to carry heavy lubricating cylinder stock oil which is the primary lubricating material. When this grease is heated it breaks up, the heavy oil separating from the soapy material. It has been found in using a lubricating plate of the before described type, that a supply of the heavy cylinder stock oil forms over the perforated section of the plate, while the wings thereof are covered with the heavier grease which seems to act as a seal to prevent waste of oil in excess of that required for lubricating purposes. This lubricating material, which is furnished commercially in the form of a rather hard, almost solid, cake of grease of self-supporting consistency, must be subjected by the rubbing of the axle or journal to more or less physical processing, in order to separate the lubricant from the carrying or solidifying vehicle. In the past, it has been the practice to form such grease cakes of almost the full width of the diameter of the journal and while perforated plates of one character and another have often been inserted between such grease cakes and the journal, such plates have invariably been made as nearly the full width of the grease cake or of the journal as was practical from structural limitations. The result in service has been that the grease has not been subjected to sufficient physical conditioning to economically utilize the lubricating material of the same, because the grease is wiped off of the cake or forced through the perforations of the rubbing plate for nearly the full width of the plate. In the present invention, the grease cake is made materially narrower than the width of the journal and materially narrower than the width of the rubbing plate, which latter, as already described, is provided with wings extending to either side of the perforated portion.

It will now be noted that, when the pressure from the spring 20 forces the grease of the cake 19 upwardly through the perforations in 10, this limited amount of grease is caught between the under face of the journal and the imperforate rubbing portions of the plate 7, so that before it is carried by the journal beyond the limits of the imperforate portion of the plate, it has been forced to yield most of its lubricating properties, and any grease which is carried past the margin of the imperforate portion of the plate and wiped off, no longer contains a high percentage of lubricating material. At the same time, a certain amount of the heavier portion of the grease adheres to the imperforate portion of the rubbing plate, and in event the journal begins to heat abnormally, then this heavy residue is acted upon by the heat and is forced to give up all remaining lubricating properties that it may possess, thereby immediately making available an increased degree of lubrication when the same is needed. As compared with this action, it will be seen that with the usual type of rubbing plate, the grease is not subjected to the physical conditioning and grease of high lubricating value is carried beyond the margins of the rubbing plate and wasted.

It will be noted that the pressure from the spring 20 not only forces the grease cake up against the perforated portion of the rubbing plate, but also forces the entire rubbing plate, including particularly the wing portions thereof, up against the under surface of the journal. This is important, as the rubbing plate will always be held in tight engagement with the journal, irrespective of wear of the journal, wear of the brass or the development of wear or play at any point. An additional advantage of using the lubricator in accordance with our invention aforedescribed, is that substantially all of the grease applied in the lubricator may be used before the follower plate 17 becomes tangent with the bottom of the foraminous portion of the lubricating plate 7, whereas when lubricating along the entire width of the cellar, or substantially the entire lower surface of the journal, a considerable amount of grease would remain on either side of the center of the device after the follower became tangent with the lubricating plate.

In view of the foregoing disclosure of our invention, it will be apparent that we have provided a lubricating device which is not only very economical of lubricating material, but which efficiently distributes said lubricating material and at the same time protects the journal from deleterious foreign matter.

Having thus described the invention, we claim:

1. In a journal lubricator, a plate curved for surrounding the lower surface of a journal, a portion of said plate being foraminous for feeding lubricating material to the journal, and adjacent portions thereof being grooved for distributing said lubricating material.

2. In a journal lubricator, a lubricating member formed with an upper surface curved coaxially with and adapted to fit a journal with which the lubricator is employed, an intermediate portion of said surface, axially disposed, being formed with perforations for feeding lubricating material to said journal, portions of said surface on either side of said perforated portion being formed with circumferential grooves for distributing said lubricating material.

3. In a journal lubricator, a plate fitting around the lower side of the journal and perforated along only a portion of the area adjacent said journal for feeding lubricating material thereto, the remainder of said plate providing relatively large areas for wiping the journal and distributing lubricating material thereon, means for forcing lubricating material through the perforations in said plate, and guiding means for said forcing means extending from the bottom of said plate at the sides of the perforated area.

4. In a journal lubricator, a plate curved for engaging the lower surface of a journal, said plate being perforated along an area axial with respect to said journal and narrower than the curved portion of the plate, for feeding lubricating material to the journal, the remainder of said plate providing relatively large areas adapted to wipe the journal and distribute lubricating material thereon, guiding means extending downwardly from said plate from edges of the perforated portion, and a follower positioned between said guiding means and spring-pressed upwardly for forcing lubricating material through the perforated portion of the plate.

5. In a journal lubricator, a plate curved for surrounding the lower surface of a journal, a portion of said plate being foraminous for feeding lubricating material to the journal, and adjacent portions thereof being grooved for distributing said lubricating material, outer edges of said plate being turned downward and engaging adjacent portions of a cellar for guiding and maintaining said plate in place.

6. In a journal lubricator, a lubricating member formed with an upper surface curved coaxially with and adapted to fit a journal with which the lubricator is employed, an intermediate portion of said surface, axially disposed, being formed with perforations for feeding lubricating material to said journal, portions of said surface on either side of said perforated portion being formed with circumferential grooves for distributing said lubricating material, said member being provided with guides extending downwardly from portions thereof adjacent the perforations, said guides serving to confine a mass of lubricating material, and a follower resiliently supported between said guides for forcing said lubricating material through said perforations.

7. In a journal lubricator, a plate curved for engaging the lower surface of a journal, said plate being perforated along an area axial with respect to said journal and substantially narrower than the curved portion of the plate, for feeding lubricating material to the journal, these portions of the plate on either side of the perforated portions providing relatively wide areas for wiping the journal and distributing lubricating material thereon, guiding means extending downwardly from said plate from edges of the perforated portion, a follower positioned between said guiding means and spring-pressed upwardly for forcing lubricating material through the perforated portion of the plate, and lugs positioned on said guiding means to facilitate removal of said plate.

8. In a journal lubricator, a plate curved for surrounding the lower surface of a journal, a portion of said plate being foraminous for feeding lubricating material to the journal, and adjacent portions thereof being grooved for distributing said lubricating material and insulated to maintain the same at a desired temperature when in operation.

9. In a journal lubricator, a lubricating member formed with an upper surface curved coaxially with and adapted to fit a journal with which the lubricator is employed, an intermediate portion of said surface being formed with perforations for feeding lubricating material to said journal, portions of said surface on either side of said perforated portion being formed with grooves for distributing said lubricating material to the journal, said member being formed with guides extending from the convex face thereof adjacent the perforations and serving to confine lubricating material therebetween, and a follower resiliently supported between said guides for feeding lubricating material through said perforations and supporting said lubricating member against said journal and maintaining the seal between the grooved portions thereon and said journal.

10. In a journal lubricator, a plate curved for engaging the lower surface of a journal, said plate being partly perforated along an area axial with respect to said journal, the remainder of said plate on opposite sides providing relatively large surfaces adapted to wipe said journal and distribute lubricating material thereon, guiding means extending downwardly from said plate from edges of the perforated portion, and a follower positioned between and provided with flanges engaging said guiding means for forcing lubricating material through the perforated portion of the plate.

11. In a journal lubricator, a lubricating member formed with an upper surface curved coaxially with and adapted to fit a journal with which the lubricator is employed, an intermediate portion of said surface being formed with perforations for feeding lubricating material to said journal, portions of said surface on either side of said perforated portion being formed with grooves for distributing said lubricating material to the journal, said member being formed with guides extending from the convex face thereof adjacent the perforations and serving to confine lubricating material therebetween, and a follower resiliently supported between said guides for feeding lubricating material through said perforations and supporting said lubricating member against said journal, said follower being formed with depending side flanges adapted to engage the adjacent portions of the guides.

12. In a journal lubricator the combination of a grease cake of a width substantially less than the diameter of the journal and a cellar housing said grease cake having outwardly projecting sides for protecting the journal, said cellar being carried by the grease cake.

13. A journal lubricator comprising a grease cake of width substantially less than the diameter of the journal, means for urging said cake upwardly against said journal and means supported by said cake for protecting a portion of the journal bearing surface on each side of said cake.

14. A journal lubricator comprising a grease cake of width substantially less than the diameter of the journal, means for urging said cake upwardly against said journal, means supported by said cake for protecting a portion of the journal bearing surface on each side of said cake and a cellar for said cake secured to and supported by said last mentioned means.

15. A journal lubricator comprising a grease cake, means for urging said cake upwardly against the journal and means supported by said cake for protecting the journal bearing surfaces at either side of said cake.

16. In a journal lubricator, the combination of a cellar member having means secured thereto for protecting a portion of the journal bearing surface on each side of said cellar, a grease cake in said cellar and means for urging said cake upwardly against said journal, said protecting means and said cellar being supported by said grease cake.

In testimony whereof we affix our signatures.

HARRY W. CODDINGTON.
HARRY F. CUNNING.